United States Patent [19]

Vize

[11] Patent Number: 4,696,409
[45] Date of Patent: Sep. 29, 1987

[54] VENTED FUEL TANK CAP ASSEMBLY

[75] Inventor: Robert M. Vize, Bettendorf, Iowa

[73] Assignee: Caterpillar Inc., Peoria, Ill.

[21] Appl. No.: 873,882

[22] Filed: Jun. 13, 1986

[51] Int. Cl.⁴ .......................................... B65D 51/16
[52] U.S. Cl. ................................. 220/203; 220/205; 220/206; 220/DIG. 33
[58] Field of Search ............... 220/208, 202, 203, 367, 220/373, DIG. 32, DIG. 33, 205; 137/41

[56] References Cited

U.S. PATENT DOCUMENTS

| | | | |
|---|---|---|---|
| 2,143,340 | 1/1939 | Willits | 220/202 X |
| 2,396,233 | 3/1946 | Abrams | 220/203 |
| 2,510,098 | 6/1950 | Geisler | 137/69 |
| 2,684,780 | 7/1954 | Friend | 220/40 |
| 2,860,656 | 11/1958 | Eshbaugh | 137/202 |
| 3,084,706 | 4/1963 | Lunde | 220/202 X |
| 3,465,912 | 9/1969 | Fleming et al. | 220/89 |
| 3,614,960 | 10/1971 | Pfrengle | 220/202 X |
| 3,752,135 | 8/1973 | Peterson et al. | 123/136 |
| 3,918,606 | 11/1975 | Keller | 220/208 |
| 3,968,897 | 7/1976 | Rodgers | 220/204 |
| 3,995,657 | 12/1976 | Horrey | 137/529 |
| 4,000,828 | 1/1977 | Crute et al. | 220/203 |
| 4,162,021 | 7/1979 | Crute | 220/203 X |
| 4,244,522 | 1/1981 | Hartwig | 239/148 |
| 4,325,398 | 4/1982 | Green | 137/39 |

Primary Examiner—Steven M. Pollard
Attorney, Agent, or Firm—Claude F. White

[57] ABSTRACT

A removable cap assembly for closing the open end of a fill spout of a fuel tank includes a built-in valve apparatus for venting the interior of the tank to the atmosphere. The valve apparatus further seals the liquid within the tank during certain operational conditions which could cause leakage of the liquid from the tank. Previous tank caps for closing the fill spout of liquid fuel tanks used various valve means to vent the tank, or to maintain a certain positive pressure within the tank. However, most previous liquid tank valve means were complex and would not prevent leakage of liquid from within the tank if the tank should be tipped drastically or upset. The vented fuel cap assembly of the present invention is of simple construction and will prevent leakage of fuel from the tank should the tank be tipped or inverted.

9 Claims, 2 Drawing Figures

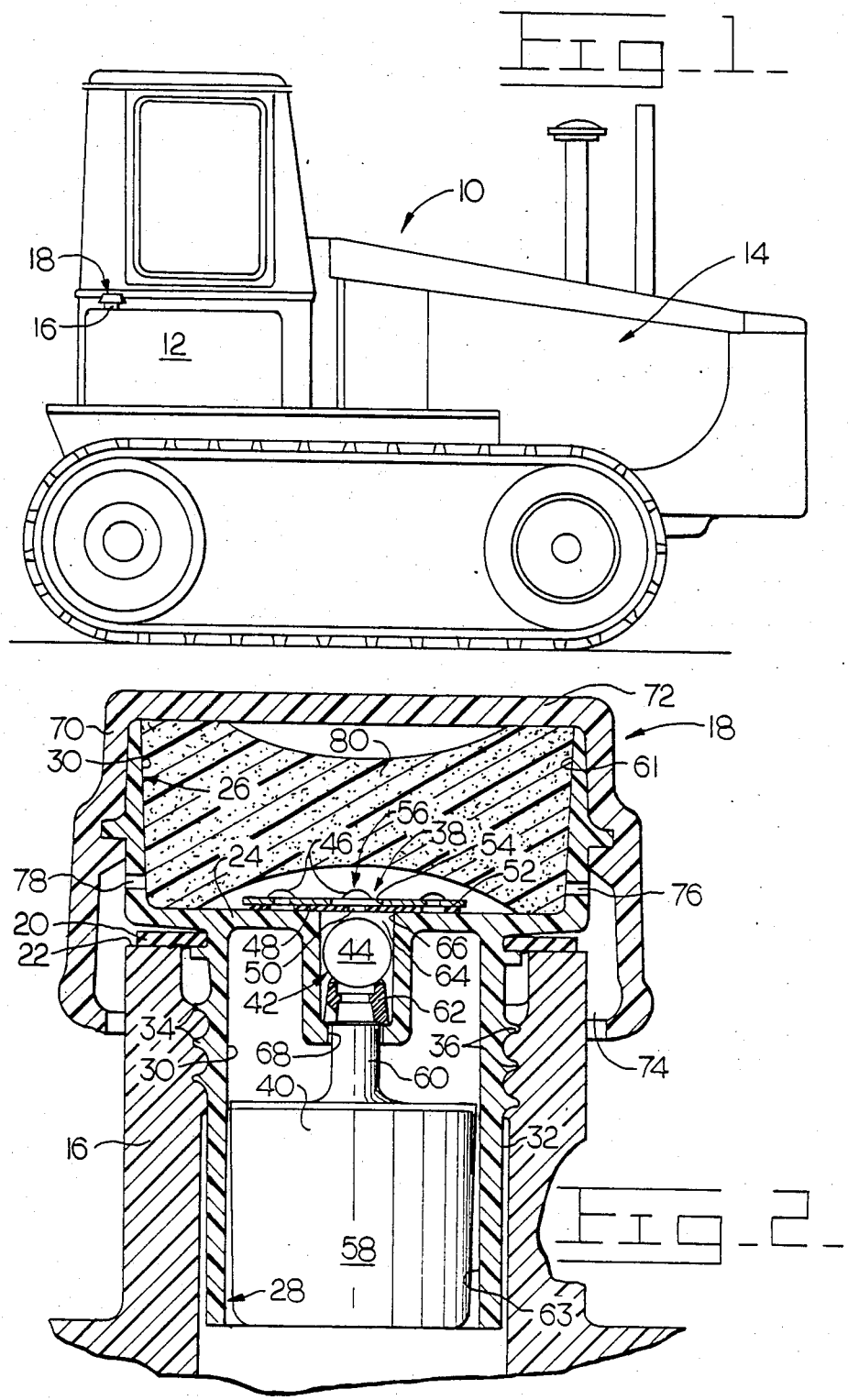

VENTED FUEL TANK CAP ASSEMBLY

TECHNICAL FIELD

This invention relates generally to a cap assembly for a fuel tank and more particularly to a cap assembly which has a valve apparatus for venting the fuel tank to the atmosphere and also for sealing the tank against fuel leakage.

BACKGROUND ART

Liquid storage tanks, including vehicle fuel tanks and liquid fertilizer tanks, utilize various types of tank caps to close off the fill spout of the tanks. These tanks are normally vented in some manner to equalize the pressure within the tank, or to maintain a small positive pressure within the tank. In many applications, the tank caps serve as the tank vent as well as the tank closure element.

One type of fuel filler cap having a valve assembly therein is disclosed in U.S. Pat. No. 3,995,657, issued to E. L. Horrey on Dec. 7, 1976. In this patent, a filler cap has a channel which communicates with the interior of a tank and with the atmosphere. A valve seat is disposed within the channel and a ball type valve member is biased by a spring, a second larger ball member, and a pivot plate into engagement with the valve seat. The ball valve is in constant engagement with the valve seat, thus forming an air tight seal, and only moves away from the seat when pressure within the tank reaches a certain predetermined pressure lower than the atmospheric pressure.

Another type of liquid tank cap having an integral valve assembly is disclosed in U.S. Pat. No. 4,244,522, issued to D. R. Hartwig on Jan. 13, 1981. This patent discloses a plurality of liquid storage tanks which are interconnected by common bases. Each tank includes a vent structure carried in the upper portion of the tank. The vent structure includes a valve arrangement having a valve seat, a rubber ball valve, and a float for supporting the ball. The ball valve is capable of sealing the tank, or venting the tank, depending on the amount and type of liquid in the tank. However, should the tank become inclined or inverted, the ball valve may not prevent escape of liquid through the tank cap.

Each of the above-noted tank caps would appear to provide sealing and venting of the tanks during certain operational conditions. However, they all appear to be ineffective in providing an unpressurized vented tank which is desirably sealed against liquid leakage.

The present invention is directed to overcoming one or more of the problems as set forth above.

DISCLOSURE OF THE INVENTION

In one aspect of the present invention, a vent cap assembly for preventing liquid flow from a tank, while permitting air flow between the atmosphere and the tank, includes a body member having first and second end portions and a passageway extending therethrough, with the body member being sealingly engageable with the tank. The vent cap assembly further includes a valve seat structure disposed across the passageway, a float apparatus disposed in the passageway, and valve means for engaging and sealing the valve seat.

Maintaining atmospheric pressure within liquid storage tanks, such as vehicle fuel tanks, is essential to satisfactory performance of the vehicle. Pressure build up as a result of heat, and creation of a vacuum due to fuel depletion, etc. must be minimized. Equalization of pressure between the inside and outside of the liquid tank is most often accomplished by a vent valve located somewhere in the tank. Often, the vent valve is built into the tank cap. However, most vent valves for venting air in and out of the liquid tank will not prevent exit of liquid from the tank through the vent valve. The subject invention provides a vent valve which allows air flow in and out of the liquid tank while preventing flow of liquid out of the tank through the vent valve.

BRIEF DESCRIPTION OF THE DRAWINGS

FIG. 1 is a diagrammatic side elevational view of a vehicle incorporating the vented fuel tank cap assembly of the present invention; and FIG. 2 is a sectional view of the vented fuel tank cap assembly of the present invention.

BEST MODE FOR CARRYING OUT THE INVENTION

Referring to the drawings, a vehicle 10, such as an agricultural tractor, has a fuel tank 12 which supplies fuel to the engine 14 of the vehicle. The tank 12 is filled through a filler spout 16 which is an integral portion of the tank 12. A vent cap assembly 18 threadably engages the filer spout 16 to substantially close off the interior of the tank 12 to the atmosphere. With the vent cap assembly 18 fully screwed into the filler spout 16, a gasket 20 contacts the top 22 of the spout 16 and makes an air and liquid tight seal between the vent cap assembly 18 and the fuel tank filler spout 16.

With particular reference to FIG. 2, the vent cap assembly 18 includes a body member 24, or housing, which has first and second end portions 26,28 and a passageway 30 having a stepped cross-sectional profile which extends through the body member 24. The exterior wall 32 of the body member 24 has a plurality of external threads 34 which are engageable with similar internal threads 36 on the filler spout 16. The cap assembly 18 further includes a valve seat structure 38, a float apparatus 40, and valve means 42, which in the illustrated embodiment is a spherical plugging member 44. As will be hereinafter explained in greater detail, the valve seat structure 38, the float apparatus 40, and valve means 42 provide controlled air flow between the interior of the tank and the atmosphere and prevent flow of liquid from the tank.

The valve seat structure 38 is disposed across the passageway 30 and is connected to the body member 24 by a plurality of fasteners 46. The structure 38 includes a flexible diaphragm 48 having a port 50, and a reinforcing plate 52 having an opening 54. The plate 52 is disposed above, and is in contact with, the diaphragm 48. With the plate 52 so disposed, the opening 54 is in general alignment with the port 50. In the preferred embodiment, opening 54 has a greater area than the area of port 50. Opening 54 and port 50 together form an orifice 56 through the valve seat structure 38.

The float apparatus 40 is disposed in the passageway 30 between the valve seat structure 38 and the second end portion 28 of the body member 24. The float apparatus has a predetermined center of mass and is displaceable between a first venting position and a second sealing position. The float apparatus 40 includes a float portion 58 and a stem portion 60 joined to said float portion, with both portions 58,60 being piloted within the passageway 30. The stem portion 60 has a smaller cross-sectional area than the float portion and extends toward the valve seat structure 38. The float apparatus 40 is maintained within the passageway 30 by a snap-type retainer 62, which snaps over the end of the stem portion 60 and extends transversely from the float stem portion 60. The body member 24 defines first and second cavities 61,63 and a central chamber 64, with the chamber 64 having first and second reduced diameter passageways 66,68. Passageway 66 is adjacent the valve seat structure 38 and passageway 68, which is smaller in diameter than passageway 66, is spaced from structure 38 toward the body member second end portion 28. The retainer 62, which is situated within the chamber 64, has a diameter which is smaller than the diameter of the first passageway 66 but larger than the diameter of the second passageway 68.

The plugging member 44 of the valve apparatus 40 rests on the top of the stem portion 60 between the valve seat structure 38 and the float apparatus 40, and is piloted wihtin the chamber 64 and the passageway 66. Plugging member 44 is preferably comprised of ceramic material and has a density which is greater than the density of the float apparatus 40 and is about one third of the density of carbon steel. In FIG. 2, the float apparatus 40 and the valve means 42 are illustrated in the first or venting position. These members can also assume a second or sealing position in which the valve means 42 engages and seals the orifice 56, thereby obstructing flow of liquid and air through the orifice 56. The sealing of the orifice 56 by the valve means 42 is accomplished in response to at least two conditions of the float apparatus 40. A first condition is when the float apparatus 40 assumes the second or sealing position, as a result of liquid in the tank 12 floating the float apparatus 40 upward to seal the orifice 56 by the valve means 42. A second condition is the result of the orifice 56 being positioned horizontally lower than the center of mass of the float apparatus 40. In either condition, the plugging member 44, which has a diameter or projected area which is greater than the diameter or area of the port 50 and the opening 54, engages the diaphragm 48 and seals off the orifice 56.

The body member 24 further includes a cover element 70 having a closed end 72 and an opposite open end 74. A plurality of radial openings 76,78 extend through the wall of the first end portion 26 of the body member 24. These openings 76,78 provide fluid communication between the stepped passageway 30 and the open end 74 of the cover 70. A filter element 80 is disposed in the first cavity 61 for filtering the air entering the tank 12 via the open end 74, the openings 76,78, the stepped passageway 30, and the orifice 56.

INDUSTRIAL APPLICABILITY

The subject vented fuel tank cap assembly 18 is particularly useful with vehicles and more specifically, agricultural type vehicles 10. Vehicles 10 of this type are powered by an internal combustion engine 14 which is supplied with fuel from a fuel tank 12 which is carried by the vehicle 10. The tank 12 is filled with fuel through the integral filler spout 16 and the removable vent cap assembly 18 closes the open end of the filler spout 16. As the fuel is consumed by the engine 14 of the vehicle 10, air must be introduced into the tank 12 to replace the consumed fuel in order to equalize pressures on the inside and outside of the tank. Air at atmospheric pressure flows into the tank via the open end 74 of the cover element 70, the openings 76 and 78, the filter element 80, the orifice 56, the central chamber 64, the second passageway 68, along the clearance between the float portion 58 and the exterior wall 32 and into the tank. If air pressure within the tank 12 increases, due to heat and other sources, air will flow out of the tank 12 along the same path that air enters the tank 12. In this manner, the interior of the tank 12 is always at atmospheric pressure, which is important when the tank 12 is non-metallic.

A vehicle 12 of this type often operates on uneven and sloping terrain. During operation on such terrain, the fuel in the tank 12 will slosh about and will flow upward into the filler spout 16. This fuel will move the float apparatus 40 and the plugging member 44 upward in the second cavity 63 until the plugging member 44 contacts the diaphragm 48 and seals off the orifice 56. Therefore, no fuel can escape through the valve seat structure 38. Once the vehicle 10 returns to level or smooth terrain, the fuel in the tank 12 levels out and the float apparatus 40 and plugging member 44 move away from the valve seat structure 38 and the orifice 56 is unsealed. Air can then again flow in and out of the tank through the orifice 56. However, with the vehicle 12 operating on rough and uneven terrain, the float apparatus 40 and plugging member 44 continue to intermittently seal and unseal the orifice 56.

If the fuel tank 12 should ever become partially or completely inverted, such as in the event of a vehicle rollover, the subject fuel tank cap assembly will prevent leakage of fuel from the fuel tank 12. In such an event, fuel in the tank 12 will flow into the filler spout 16 and around the float portion 58 to fill the second cavity 63 and the central chamber 64. The float portion 58 will then float upward in the fuel and away from the valve seat structure 38. The plugging member 44, however, will separate from the stem portion 60 and move toward the valve seat structure 38 until it contacts the diaphragm 48 and seals the orifice 56. The high density of the plugging member 44 ensures that it will sink in the fuel and seal off the orifice 56. The subject vented fuel tank cap assembly 18 effectively seals the fuel tank 12 against fuel leakage while providing vented communication between the tank 12 and the atmosphere.

Other aspects, objects, and advantages of this invention can be obtained from a study of the drawings, the disclosure, and the appended claims.

I claim:

1. A vent cap assembly for obstructing liquid egress from a tank through the cap assembly and for permitting gaseous exchange between the tank and the atmosphere, said cap assembly comprising:
   a body member having first and second end portions and an interior passageway, said passageway having a stepped cross section profile and being open and unrestricted at the second end portion;
   a valve seat disposed in said body member across said passageway and having an orifice therethrough, said valve seat including a flexible diaphragm having a port therein which forms a part of said orifice;
   a float disposed in said passageway between said valve seat and said second end portion of said body member, said float being movable between a sealing position and a venting position; and
   valve means for sealing said orifice in response to one of a condition of said float assuming said sealing position and a condition of said orifice being at a lower elevation than said float's center of mass, said valve means including;

a spherical plugging member disposed in said passageway between and being engageable with said float and said valve seat, said plugging member having a projected area which is greater than the area of said port, and having a density which is about ⅓ the density of carbon steel.

2. The vent cap assembly of claim 1 wherein said float includes:

a float portion piloted within said passageway; and a stem portion joined to said float portion and piloted wihtin said passageway, and extending toward said valve seat.

3. The vent cap assembly of claim 2 wherein said stem portion has a smaller cross sectional area than said float portion.

4. The vent cap assembly of claim 1 further including a first cavity defined by said body member first end portion and a filter medium disposed in said first cavity.

5. The vent cap assembly of claim 1 wherein said body member includes:

a housing having first and second end portions, said first end portion having a wall having radial openings extending therethrough;

a cover element disposed about said housing first end portion, said cover element having a closed end and an open end, said open end being in fluid communication with said passageway through said openings.

6. The vent cap assembly of claim 1 further including: means for retaining said float in said passageway.

7. The vent cap assembly of claim 6, wherein said retaining means includes:

a retainer having a predetermined diameter and being attached to and extending transversely from said float apparatus at a predetermined location thereof; and said body member passageway having a first diameter adjacent said valve seat and a second smaller diameter spaced from said valve seat toward said body portion second end, said retainer diameter being smaller than said passageway first diameter and greater than said passageway second diameter.

8. The vent cap assembly of claim 1 wherein said valve seat further includes:

a reinforcing plate having an opening therethrough and being disposed above and adjacent said diaphragm, said opening being in general alignment with said port and having an area greater than the area of said port.

9. The vent cap assembly of claim 1 wherein said plugging member is a sphere of ceramic material.

* * * * *